Patented Aug. 18, 1953

2,649,447

UNITED STATES PATENT OFFICE 2,649,447

PREPARATION OF 2-THIOCYANO-4,6-DIAMINO-S-TRIAZINE

Donald W. Kaiser, Old Greenwich, and John J. Roemer, Stamford, Conn., assignors to American Cyanamid Company, New York, N. Y., a corporation of Maine No Drawing. Application July 2, 1952,
Serial No. 296,932

6 Claims. (Cl. 260—249.8)

The present invention relates to the preparation of 2-thiocyano-4,6-diamino-s-triazine.

According to the present invention 2-thiocyano-4,6-diamino-s-triazine is prepared by subjecting dicyanoguanidine to the action of thiocyanic acid in an inert menstruum.

In a preferred embodiment of the invention the dicyanoguanidine and the thiocyanic acid are released in situ by treating a solution of their metal salts with a stoichiometric amount of a strong mineral acid, such as hydrochloric, sulfuric, nitric, or the like. The reaction is preferably carried out at a temperature in the range of about —10° to 110° C., and preferably at —10° to 25° C. The inert menstruum for the reaction can be water, a lower alcohol, a Cellosolve, dioxane, acetone, or the like. In general virtually any neutral water-miscible menstruum is satisfactory.

When releasing free dicyanoguanidine in situ by acidifying a dicyanoguanidine salt, substantially any of the well known salts can be used, such as potassium, sodium, magnesium, zinc, ammonium, barium, calcium, and the like. Similarly substantially any thiocyanate salt can be used as a source of thiocyanic acid, when it is desired to prepare this reactant in situ. The alkali metal thiocyanates are eminently suited as a source of thiocyanic acid.

The ratio of dicyanoguanidine reactant to thiocyanic acid reactant is not critical and can vary within the respective mole ratio of 1–100:1–100. However, it is preferred to use thiocyanic acid in excess over dicyanoguanidine, preferably in about the mole ratio used in the following example, which sets forth a preferred embodiment of the invention.

Example

Potassium dicyanoguanidine (14.7 grams–0.1 mole) and 50 cc. of $H_2O$ were placed in a 500 cc. three-necked flask equipped with a stirrer, thermometer, and addition funnel. Heating on a steam bath brought about complete solution. The solution was cooled to 25° C., 5 cc. of dilute sulfuric acid (30 g. of concentrated $H_2SO_4$ diluted to 30 cc.) was added to release free dicyanoguanidine. On cooling to 10° C., dicyanoguanidine and potassium sulfate separated from solution. To the resultant pasty slurry potassium thiocyanate (48.5 g.–0.5 mole) was added. This addition caused the temperature to fall to —5° C. and liquefied the paste. The remainder of the dilute acid solution was then added at 0° to 5° C. in fifteen minutes to form free thiocyanic acid. The reaction mixture was then held at 15–20° C. for a total time of two hours. The resultant mixture was filtered to remove a little insoluble matter, and acetic acid was added to bring the filtrate to a pH of approximately 4, to precipitate the desired thiocyano diamino triazine. Yield, 12.5 grams (71.5%).

When using an inert menstruum other than water, the product may be recovered from solution by the addition of slightly acidified water, whereby the product will precipitate from solution, and can be filtered.

2-thiocyano-4,6-diamino-s-triazine is a new compound useful for direct application (in acetone solution) as an insecticide and moth-proofing agent. It is also useful as an antioxidant, and as a chemical intermediate in the synthesis of synthetic resins, dyes, pharmaceuticals, photographic reagents, and the like.

While the invention has been described with particular reference to specific embodiments, it is to be understood that it is not to be limited thereto but is to be construed broadly and restricted solely by the scope of the appended claims.

We claim:

1. The method of preparing 2-thiocyano-4,6-diamino-s-triazine that comprises subjecting dicyanoguanidine to the action of thiocyanic acid in an inert menstruum at a temperature in the range of —10° to 110° C.

2. The method according to claim 1 in which the temperature is —5° to 25° C.

3. The method of preparing 2-thiocyano-4,6-diamino-s-triazine that comprises subjecting dicyanoguanidine to the action of thiocyanic acid in water at a temperature in the range of —10° to 100° C.

4. The method of preparing 2-thiocyano-4,6-diamino-s-triazine that comprises dissolving an alkali metal salt of dicyanoguanidine and a molar excess of alkali metal thiocyanate in water, adding thereto sufficient acid to release free dicyanoguanidine and thiocyanic acid, holding the reaction mass at a temperature in the range of —10° to 100° C. to form 2-thiocyano-4,6-diamino-s-triazine, and recovering the thus formed triazine.

5. The method according to claim 4 in which the reaction is conducted at a temperature in the range of —5° to 20° C.

6. The method according to claim 5 in which the initial dicyanoguanidine salt is potassium dicyanoguanidine, and the initial thiocyanate salt is potassium thiocyanate.

DONALD W. KAISER.
JOHN J. ROEMER.

No references cited.